United States Patent
Virtanen et al.

(10) Patent No.: US 6,401,514 B1
(45) Date of Patent: Jun. 11, 2002

(54) SHEET FABRICATION CENTER WITH A FORCE DIRECTION CONVERSION DRIVE

(75) Inventors: Mikka Virtanen, Helsinki; Jorma Taijonlahti, Yliharma, both of (FI)

(73) Assignee: Lillbacka Jetair Oy, Kauhava (FI)

(*) Notice: Subject to any disclaimer, the term of this patent is extended or adjusted under 35 U.S.C. 154(b) by 0 days.

(21) Appl. No.: 09/606,246

(22) Filed: Jun. 29, 2000

(51) Int. Cl.[7] .............................................. B21D 28/20
(52) U.S. Cl. ......................................... 72/452.9; 72/441
(58) Field of Search ........................... 72/81, 441, 442, 72/443, 452.1, 452.2, 452.4, 452.7, 452.8, 452.9, 477; 74/56, 110, 569; 82/11.1; 83/548

(56) References Cited

U.S. PATENT DOCUMENTS

| | | | |
|---|---|---|---|
| 348,731 A | * 9/1886 | Gargrave | ..................... 83/548 |
| 1,999,057 A | 4/1935 | Peterson | |
| 4,296,614 A | 10/1981 | Valks | |
| 5,186,037 A | * 2/1993 | Bihler | ......................... 72/442 |
| 5,199,293 A | 4/1993 | Catti | |
| 5,417,097 A | * 5/1995 | Kojima et al. | ................ 72/442 |
| 5,701,782 A | 12/1997 | Padula | |
| 6,021,658 A | 2/2000 | Liinamaa | |

FOREIGN PATENT DOCUMENTS

| | | | |
|---|---|---|---|
| DK | 19143 | * 8/1914 | ................. 72/452.7 |
| JP | 1-218707 | * 8/1989 | ................... 72/477 |
| JP | 2-255202 | * 10/1990 | ................... 72/447 |

* cited by examiner

Primary Examiner—Lowell A. Larson
(74) Attorney, Agent, or Firm—Louis Woo (57) ABSTRACT

A sheet fabrication machine includes a direction convert mechanism that converts the movement of the driving mechanism along one direction to drive the tool for fabricating a worksheet in another direction. The direction conversion mechanism includes a carriage plate whereon a plurality of direction convert units may be mounted. Each of the direction convert units may be configured in the form of a cam that has a number of contact surfaces each having a preset angle. The carriage plate is interposed between a drive contact, such as for example a rotating mechanism, and the ram that presses against the tool of the machine. When one of the cams in the carriage plate is positioned into alignment with the rotating mechanism and the ram, the rotating mechanism is moved along the one direction so that it applies a biasing force against the cam. As the roller makes contact with each contact surface of the cam, the carriage plate is forcibly biased by the roller to thereby push against the ram with the particular force and speed preset for that particular cam to drive the ram.

30 Claims, 8 Drawing Sheets

SHEET FABRICATION CENTER WITH A FORCE DIRECTION CONVERSION DRIVE

RELATED APPLICATION

This application is related to application serial No. 09/174,576 filed Oct. 19, 1998 having as inventors the same inventors as the instant invention. The disclosure of the '576 patent is incorporated by reference herein.

FIELD OF THE INVENTION

The present invention relates to sheet fabrication centers and machines such as for example turret punch presses, and more particularly a sheet fabrication machine that utilizes a direction conversion mechanism for driving the tool of the machine.

BACKGROUND OF THE INVENTION

The aforenoted '576 application discloses a sheet fabrication machine that utilizes a contact mechanism, in the form of a roller for example, that is movable along the direction parallel to the plane of the worksheet, for making contact with the ram of the tool assembly for driving the tool in a direction that is essentially orthogonal to the direction in which the roller is driven. By thus converting a force that is movable in one direction for driving the tool in another direction, the machine as described in the '576 application is able to perform a number of innovative techniques that could not be achieved, or achieved with great difficulties, by prior sheet fabrication machines.

As disclosed in the '576 application, the mechanism for converting the drive movement along one direction into a driving force in another direction is provided by the interaction between a roller and a preconfigured mechanism such as for example a cam. Such mechanism works well so long as the work to be performed on a worksheet requires a particular force at a given speed. To change to a different force, for the machine as described in the '576 application, either the roller or the cam of the force direction conversion mechanism has to be replaced. Needless to say, such replacement not only is time consuming but requires that the machine be shut down during the mechanism exchange process.

An improved force direction conversion mechanism is therefore needed for enhancing the operation of a sheet fabrication machine.

SUMMARY OF THE INVENTION

The improved sheet fabrication machine of the instant invention utilizes a plurality of cams working cooperatively with a contact mechanism such as for example a roller. In a first embodiment, the plurality of cams are fixedly mounted to a carriage plate that is positioned over the tool mechanism. The carriage plate is movable, by means of either hydraulic or servo drives, to position one of the cams to interpose between the roller and the tool. Once accurately positioned, by moving the roller in one direction such as for example the x axis, the cam, which has at least one surface that makes contact with the roller, would convert the force supplied by the roller in the x direction into another direction such as for example along the z axis, to thereby drive the tool along the z axis.

The tool, for the invention at hand, could also mean the die. Thus, two different carriage plates, one for the upper tool and one for the lower tool such as for example the die, could be provided to correspondingly drive both tools in a manner as described in the aforenoted '576 application.

To move the carriage plate so as to position a particular cam over the tool, and more particularly the ram that drives the tool, a drive mechanism such as for example a servo-motor or a hydraulic drive may be used. The positioning of the carriage plate may be done in an accurate fashion by means of a ball screw drive, whose accuracy may be monitored by the coupling of a sensor thereto.

The positioning of the carriage plate may be done in a linear fashion. Alternatively, a rotational movement of the carriage plate may be effected to align the appropriate cam between the drive roller and the ram of the machine. Such rotational movement is especially effective if there are even numbers of cams concentrically mounted onto the carriage plate.

In place of positioning a carriage plate with a plurality of cams mounted thereon between the drive roller and the ram, a second embodiment of the instant invention sheet fabrication machine has mounted to a carriage movable along a linear guide in a first direction a plurality of cams. These cams are mounted in line along the carriage so that, as the carriage is driven along the first direction, a particular cam would come into contact with a contact mechanism mounted over the ram, so that the ram is driven along an other direction to drive the tool. By controlling the movement of the carriage along the guide, the tool may be driven with different forces at different speeds via the different cams.

For the first embodiment whereby a plurality of cams are mounted to a carriage plate, insofar as only one of the cams is positioned between the drive mechanism and the ram at any one time, the idle cam can in fact be exchanged for another cam while the machine is in operation.

It is therefore an objective of the present invention to provide a sheet fabrication machine with a force direction conversion mechanism that allows the user to select from among a number of choices the desired cam with the appropriate speed and force for punching the tool.

It is another objective of the present invention to provide a user a choice of the force and speed with which he can operate the punch of the machine without having to first idle or stop the operation of the machine.

It is yet another objective of the present invention to provide a sheet fabrication machine that can fabricate a worksheet with different forces and speeds during the same operation.

BRIEF DESCRIPTION OF THE FIGURES

The above-mentioned objectives and advantages of the present invention will become apparent and the invention itself will be best understood with reference to the following description of an embodiment of the invention taken in conjunction with the accompanying drawings, wherein.

DETAILED DESCRIPTION OF THE INVENTION

Figure 1:
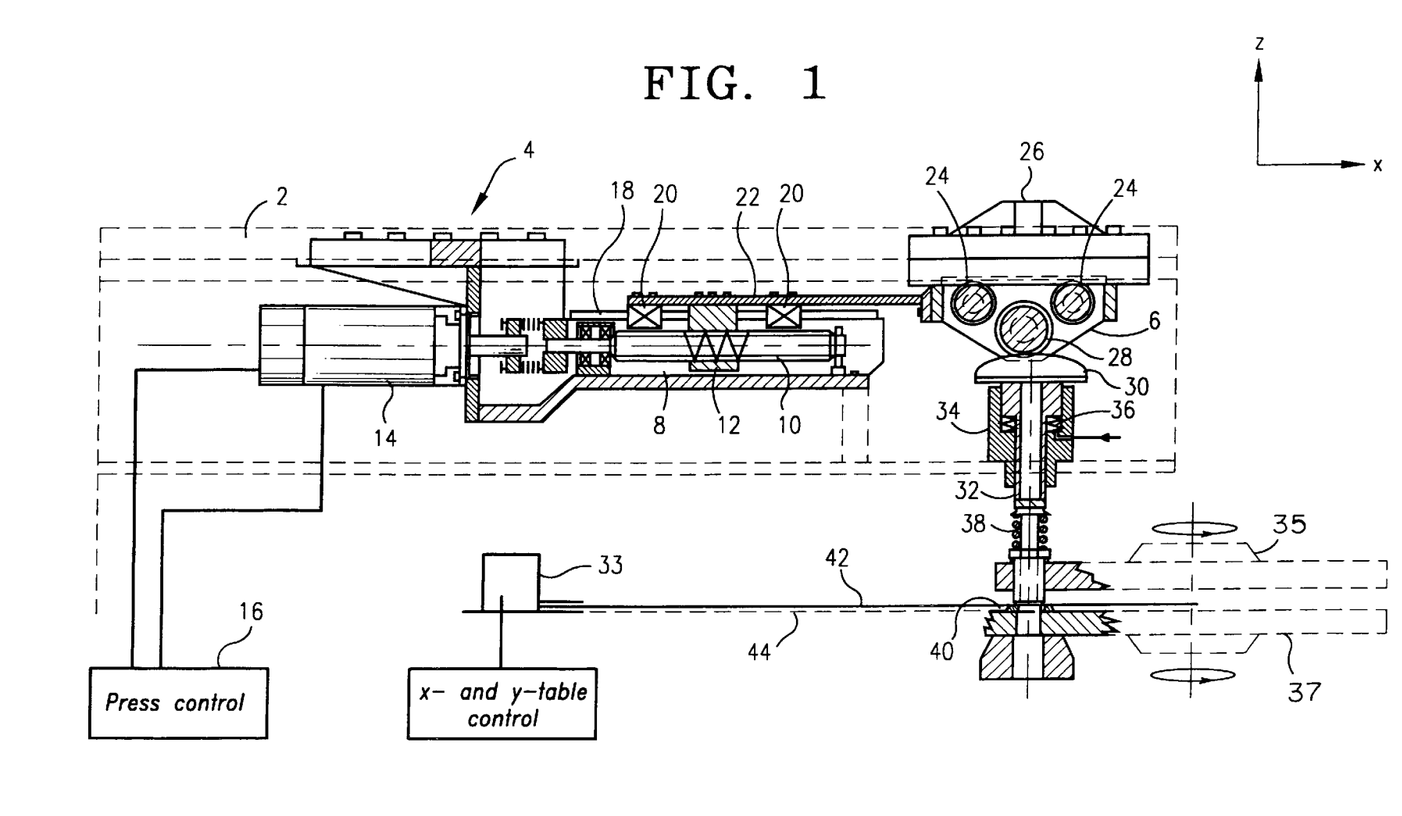
FIG. 1 is an illustration of an exemplar driving mechanism of the sheet fabrication machine of the instant invention.

An overall view of the mechanism for converting the movement of the drive along one direction to a movement along another direction for driving the tool is illustrated in FIG. 1. As shown, the sheet fabricating machine has a frame 2, in a dotted outline form, that has mounted thereto a drive mechanism 4 for driving a contact body mount 6 bidirectionally along one direction such as for example the x axis. To drive body mount 6 along the x axis, drive mechanism 4 has a carriage 8 that includes a screw shaft 10 and a nut arrangement 12 mounted thereabout. Screw shaft 10 in turn is connected to the output of a servomotor 14, or other equivalent motor drive such as a for example a hydraulic motor. The operation of servomotor 14 is controlled by a processor controller 16.

Carriage 8 also includes a linear drive 18 which has movably mounted thereto, by means of couple bearings 20, a drive shaft 22, which is connected to body mount 6. Movably coupled to body mount 6 are two guide bearing rollers 24 that movably glide along a top frame 26 of the sheet fabrication machine. Thus, when servomotor 14 is actuated, screw shaft 10 is rotated, either clockwise or counter-clockwise, to thereby threadedly move nut arrangement 12 therealong. And given that the drive shaft 22 is fixedly coupled to nut arrangement 12, the movement of nut arrangement 12 in turn drives shaft 22 to move in the direction along the x axis, thereby driving body mount 6 along the same direction. The actuation of servomotor 14, and therefore the movement of nut arrangement 12 and drive shaft 22 along the x axis, is controlled by controller 16.

Body mount 6 has rotatably mounted thereto a rotating mechanism such as for example a roller 28. Roller 28 in turn is positioned relative to a cam 30, which is associated with and may be integrated to the head of a ram 32 that is movable bidirectionally along another direction such as for example the z axis. Ram 32 is mounted in a housing 34, which may be a pneumatic drive housing that includes the appropriate spring 36 to provide a constant upwards biasing force against the top portion of ram 32, to thereby constantly bias cam 30 against roller 28 of mount body 6.

The sheet fabricating machine of the instant invention further has conventional upper and lower turrets 35 and 37, respectively, each holding a plurality of coacting tools at their respective peripheries. One such pair of tools is shown to be positioned under ram 32. In particular, upper tool 38 is shown to be pressed by ram 32 to work cooperatively with a lower tool, or die 40, for effecting work on a worksheet 42, which is placed on a table 44. Worksheet 42, as is well known, is moved by a clamping mechanism 33 which may include a number of clamps that are capable of moving worksheet 32 on worktable 44 along its x and y axes.

As disclosed in the aforenoted '576 application, by controlling the movement of body mount 6, with reference to cam 30, an efficient driving of ram 32 along the vertical direction to drive tool 38 to work coactively with die 40 to punch holes in worksheet 42 can be effected. The system of FIG. 1 works well. However, it is limited to the use of a single direction converting cam 30.

To improve the system of FIG. 1, the inventors came up with the concept of having a direction convert mechanism that includes a plurality of units each of which could function to convert the movement of the driving mechanism along one direction into a movement along another direction, which may be orthogonal to the one direction, for driving the tool. By having a plurality of direction convert units with the respective angles for the units being preconfigured differently, the force and the speed with which a tool is punched by each of the units could be preset.

Figure 2:
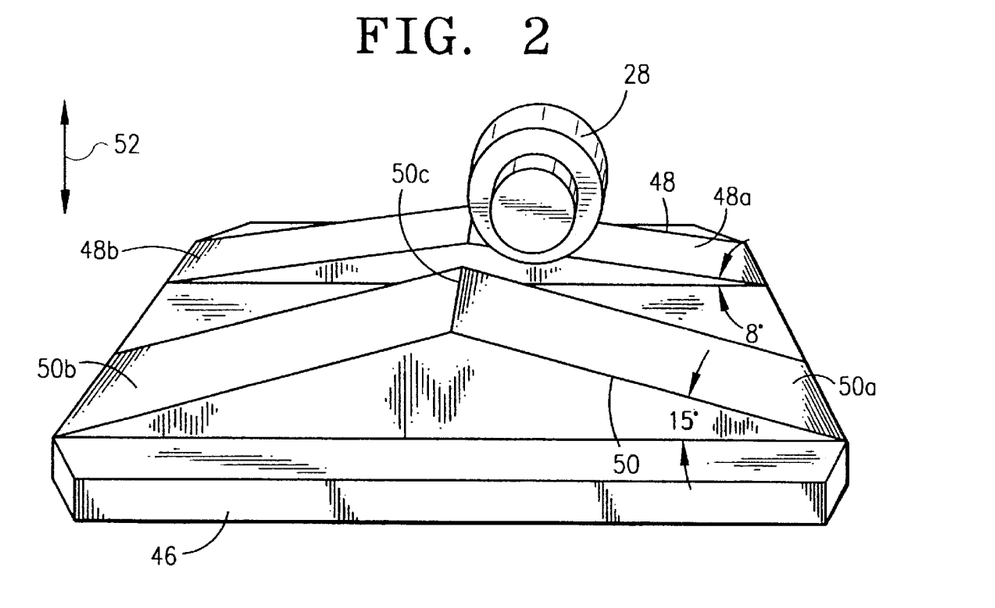
FIG. 2 is a semi-perspective view of a carriage plate whereon two different cams are mounted.

To achieve this end, the inventors interposed a carriage plate, such as for example plate 46 shown in FIG. 2, between body mount 6 and ram 32. As shown by the exemplar carriage plate 46 of FIG. 2, two cams 48 and 50 are mounted thereon. For exemplar plate 46, each of cams 48 and 50 has two contact surfaces 48a, 48b and 50a, 50b, respectively. Each of the two respective surfaces of cams 48 and 50 is configured to come into contact with roller 38 so that carriage plate 46 could be moved bidirectionally, as indicated by bidirectional arrow 52, for driving ram 32.

For exemplar cam 48, note that surface 48a is configured to slope at an angle, for example 8 degrees, toward the center of cam 48 to intersect with surface 48b, also assumed to be rising at an angle of 8 degrees from its base. The point where surfaces 48a and 48b meet forms an apex for cam 48. Similarly, surface 50a of cam 50 extends upwardly at an angle, for example 15 degrees, to intersect with surface 50b at an apex 50c. Note that the respective angles of 8 and 15 degrees for cams 48 and 50 are meant for illustration only, as the angle whereby a contact surface of a cam slopes upward from its base could be configured at any angle, so as to effect an efficient combination of force and speed for driving ram 32 to punch tool 38.

For the exemplar cams mounted to carriage plate 46, using the following equation, it is possible to predefine the movement of the ram by controlling the movement of screw shaft 10.

$F_v = F_h / \mathrm{Tan}$ (angle) where
  $F_v$=vertical force in the ram head
  $F_h$=horizontal force to move the cam elements
  Angle=angle of the cam element From the above equation, it could readily be calculated that a cam that has a smaller angle in fact could deliver a greater force to ram 32. Thus, taking the exemplar angles 8 degrees and 15 degrees in tow, it could be calculated that for cam 48, a force of 200 KN is generated; whereas for cam 50, a force of 100 KN is generated.

Conversely related to the force is the speed with which the ram could be driven. For the smaller the force, the faster the speed. In other words, when cam 48 is contacted by roller 48, a 200 KN force is generated to press down on carriage plate 46 at a speed that is slower than when 100 KN is generated when roller 28 contacts surfaces 50a, 50b of cam 50. Putting it simply, since cam 50 has a larger angle, its movement is faster, relative to cam 48. Therefore, it does not need to be pressed by roller 28 for as long as cam 48. Accordingly, a shorter stroke by screw shaft 10 could be effected when cam 50 is used.

Figure 3:
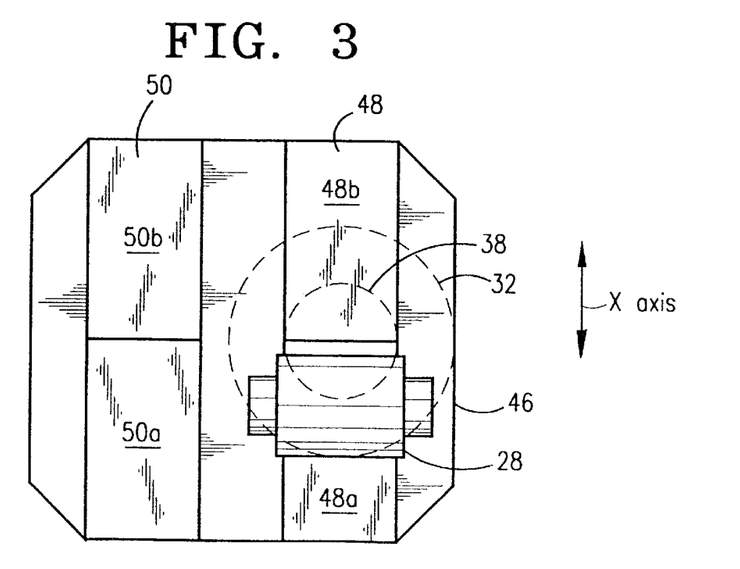
FIG. 3 is a top view of the carriage plate of FIG. 2 illustrating the interaction among one of the cams, the roller and the ram that is being driven.

With respect to FIG. 3, the inter-relationship of carriage plate 46, cams 48 and 50, roller 28, ram 32 and tool 38 are shown. For the FIG. 3 illustration, assume that carriage plate 46 has been moved to position cam 48 into contact with roller 28. As shown, when thus positioned, cam 48 is interposed between ram 32 and roller 28, so that as roller 28 is moved along the x axis, carriage plate is moved along the direction into and out of the paper to thereby drive ram 32, and therefore tool 38, likewise along the direction perpendicular to the x axis.

Figure 4:
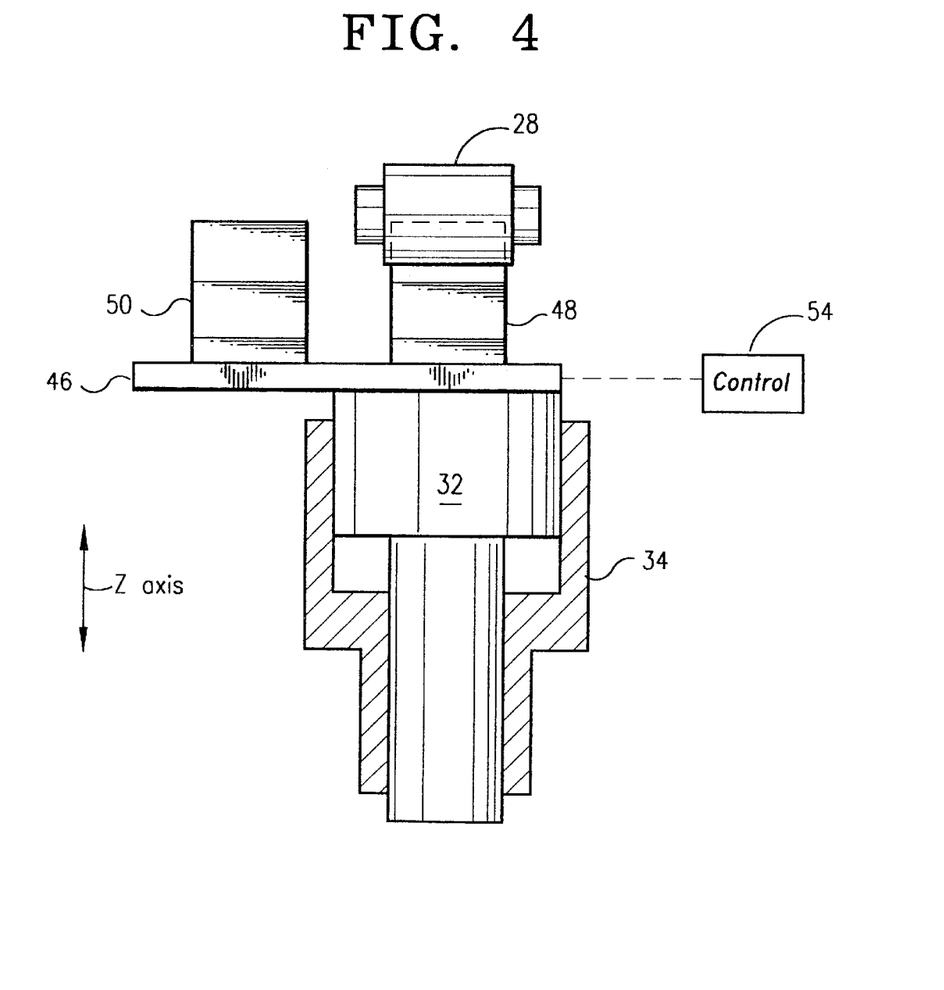
FIG. 4 is a side view showing one of the cams at the carriage plate of FIG. 3 in contact with the roller of the driving mechanism for converting the movement of the roller along one direction into a movement along another direction for driving the tool.

FIG. 4 is a side view illustrating the inter-relationship of roller 28, cam 48, carriage plate 46 and ram 32. As shown, carriage plate 46 has been moved by controller 54 into alignment with roller 28 and ram 32 along the z axis. Although not shown, controller 54 operates a drive such as for example a ball screw drive for moving carriage plate 46 linearly along the plane sandwiched by roller 28 and ram 32. Once positioned between roller 28 and ram 32, as it is driven along the x axis, roller 28 comes into contact with surfaces 48a and 48b of cam 48, to thereby forcibly press carriage plate 46 in a downward direction. This downward movement in turn drives ram 38 to press down against ram 32 to work on worksheet 42.

Figure 5:
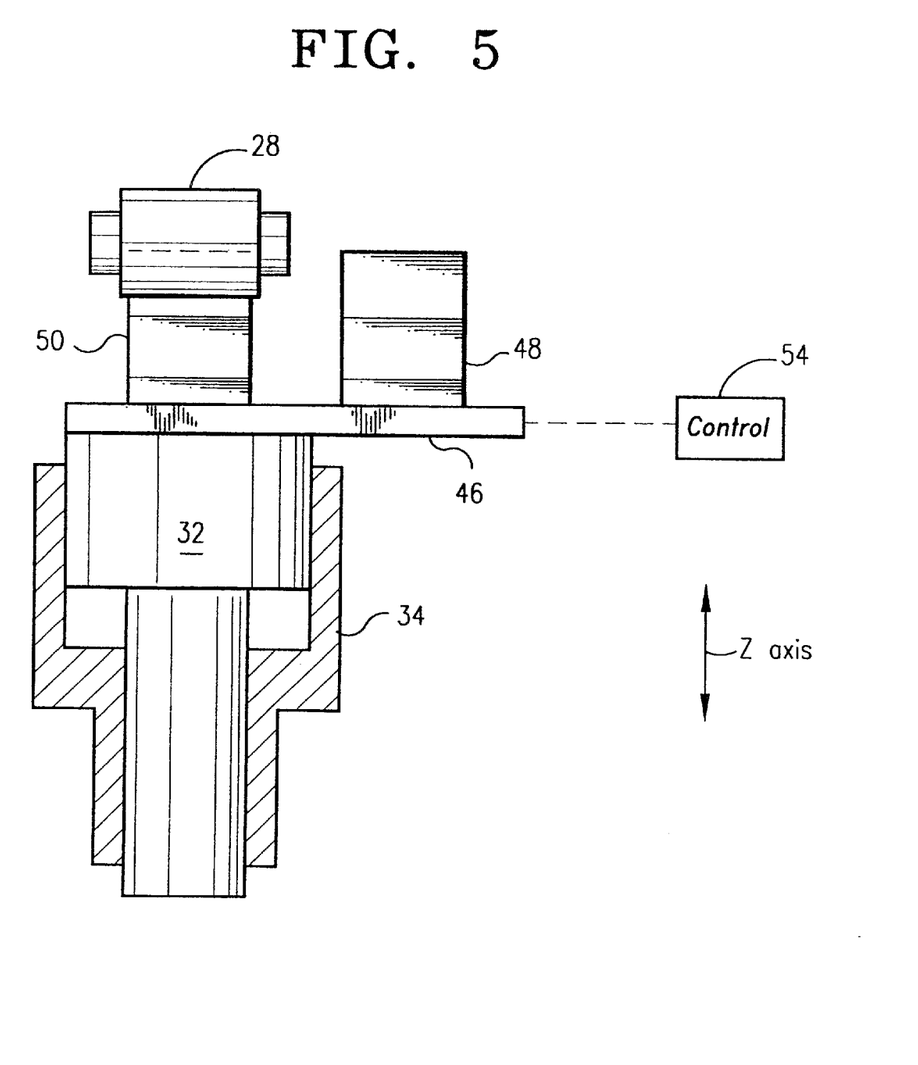
FIG. 5 shows the use of the other cam mounted to the carriage plate of FIG. 3 for driving the tool.

FIG. 5 illustrates the moving of carriage plate 46 by controller 54 to align along the z axis roller 28, cam 50 and ram 32. By thus positioning cam 50 into contact with roller 28, as was mentioned previously, a faster but less powerful force is exerted on ram 32 to press against tool 38. The movement of carriage plate 46 for aligning a selected cam to drive a tool may be effected for example by gears that are integrated to carriage plate 46 that mesh with coacting gears of a servo or hydraulic driver motor controlled by controller 54. It should be appreciated that albeit FIGS. 4 and 5 each show the pressing of ram 32 by carriage plate 46, the same set up with respect to carriage plate 46 is equally applicable for pressing the lower tool or die 40 as shown in FIG. 1. In other words, a similar set up of a drive contact mechanism including interfacing cams may also be provided in the sheet fabrication machine of the instant invention to drive lower die 40 for up forming or up pressing a worksheet against an upper tool.

Figure 6:
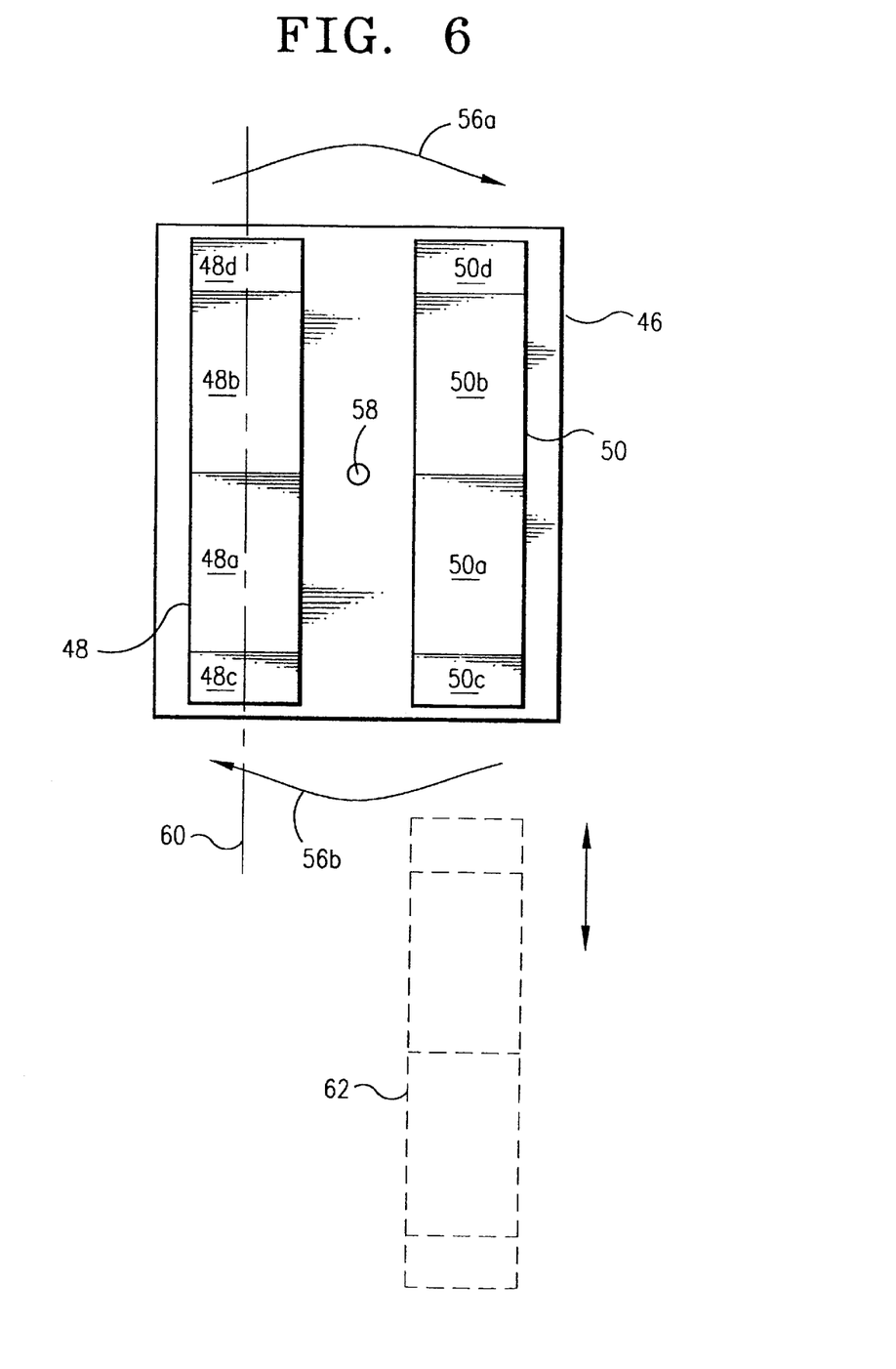
FIG. 6 is an illustration of the carriage plate of FIG. 3 being moved by a rotational movement and the exchanging of one of the cams on the carriage plate with another cam while the other cam of the carriage plate is being used for converting the directional movement of the drive mechanism to drive the tool.

As shown in FIG. 6, carriage plate 46, instead of being moved linearly as shown in FIGS. 4 and 5, could also be rotated, as indicated per directional arrows 56a, 56b, about a center of rotation 58. Of interest to note in FIG. 6 is that when one of the cams, for example cam 48, is aligned into position with roller 28 and is being contacted thereby as indicated by the dotted line 60, which corresponds to the center line of the roll movement of roller 28, for pressing against ram 32, the other cam, namely cam 50 as shown in FIG. 6, may be exchanged with another direction convert unit cam such as for example cam unit 62. This is achievable by providing mating flanges/grooves (not shown) to the cams and carriage plate 46, so that a cam could easily be coupled to carriage plate 46. Of course, other equivalent means such as mating anchor bolts or screws may also be used for coupling a cam to carriage plate 46.

Although not shown in FIG. 6, a magazine or storage bin that contains a plurality of cams of different inclined contact surfaces is positioned relative to carriage plate 46, or may in fact replace cam unit 62, so that cam 50, and also cam 48 after plate 46 has been rotated 180 degrees, may be replaced by selective ones of an "unlimited" number of cams. The respective cams stored in the magazine may be retrieved by a processor controlled cam changer that automatically replaces the cam not being used at carriage plate 46 with the retrieved cam. Such cam changer may include for example computer controlled dampers that would, not necessarily in the following particular order, grasp and remove the to be replaced cam from the cam plate, retrieve an appropriate or desired cam from the cam magazine, and then fixedly couple the retrieved cam to the appropriate location on the carriage plate.

Thus, as shown in FIG. 6, given that the cam exchange operation (cam 50 being replaced by another cam such as cam 62) is synchronized with the pressing operation (cam 48 being pressed), unlimited different punching or pressing operations could take place as carriage plate 46 is rotatable to position a new cam under the cam driver as soon as each operation using a given cam is finished.

It should further be appreciated that cams 48 and 50 shown in FIG. 6 each have more than two contact surfaces. In contrast to the cams shown in FIGS. 2 and 3, cams 48 and 50 in FIG. 6 each have 4 contact surfaces, identified for example as 48a, 48b, 48c, 48d and 50a, 50b, 50c, 50d. The respective angles of adjacent surfaces such as for example between surfaces 50b, 50d and 50a, 50c in cam 50 could vary from each other, as well as from the angle between the end surfaces, namely surfaces 50c, 50d and the base of carriage plate 46. Accordingly, roller 28, when in contact with each of surfaces 48a to 48d or 50a to 50d, could in fact be exerting different forces at different speeds to ram 32. This variation of force/speed for driving ram 32 is desirable for certain operations such as for example an operation where the tool is initially moved at a higher speed into contact with the surface of the worksheet and then a greater force is applied to the tool to punch the worksheet. Another operation that may require a cam with multiple contact surfaces is forming.

Figure 7:
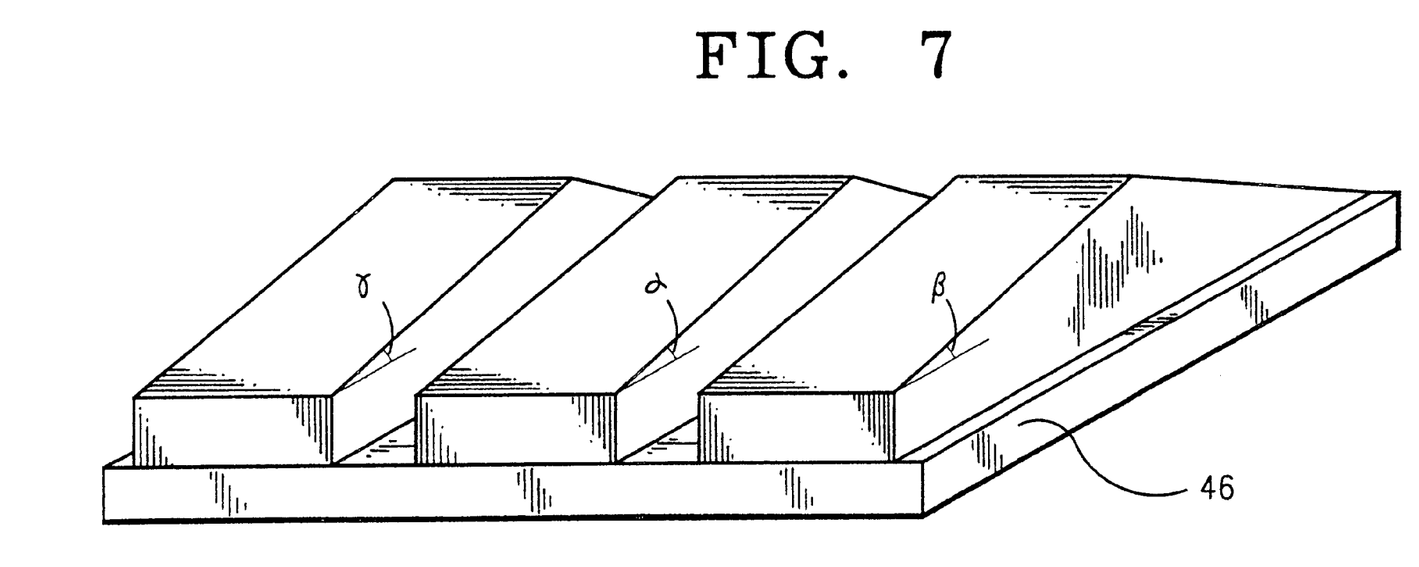
FIG. 7 is a perspective view of a carriage plate whereon a plurality of cams, i.e., MULTICAM™, are mounted.

As shown in FIG. 7, carriage plate 46 may have mounted thereon more than two direction convert units. In other words, a plurality of direction convert units or cams may be mounted to a single carriage plate 46. Thus, for the carriage plate as shown in FIGS. 2 and 3, it could be said that such carriage plate is a TWIN CAM™, whereas carriage plate 46 shown in FIG. 7 is a MULTICAM™. As each cam mounted to carriage plate 46 has a different angle of incline, a multiple number of choices could be chosen by the operator to drive ram 32.

Figure 8A:
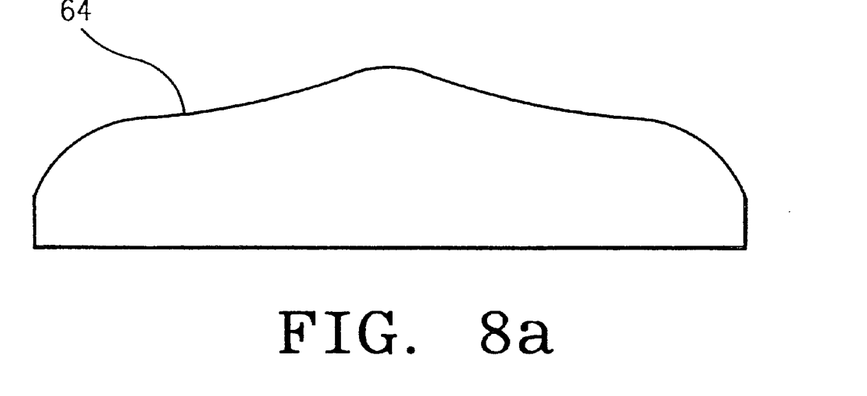
FIGS. 8a–8c are cross-sectional views of different exemplar cams and the respective contact surfaces of those cams for effecting the conversion of movements along one direction into movements in another direction.
Figure 8B:
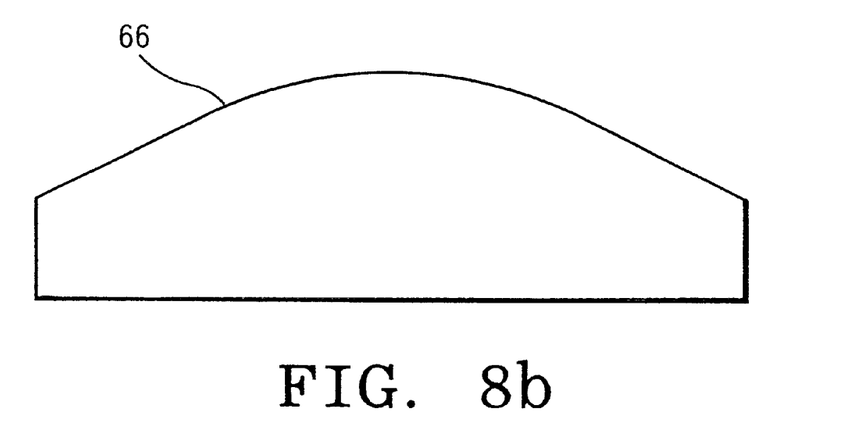
Figure 8C:
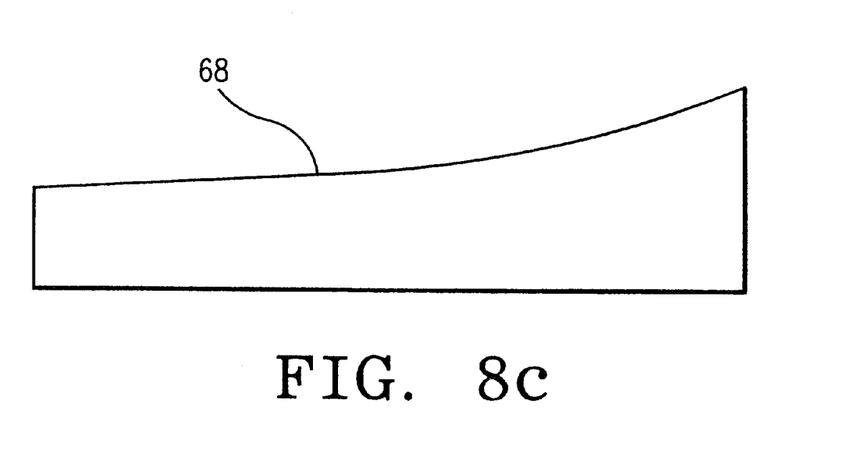

Instead of inclining contact surfaces that intersect to form an apex, the cams that are provided to carriage plate 46 may in fact be configured with nonlinear surfaces such as 64, 66 and 68, as shown in FIGS. 8a, 8b and 8c, respectively. Thus, depending on the type of fabrication required on a worksheet, a cam having a special contoured contact surface may be designed for filling the requirements for that particular operation. Note that although three cams each with a differently contoured surface are shown in FIGS. 8a—8c, it should be appreciated that other contoured surfaces, both linear and nonlinear, are also envisioned by the inventors.

Figure 9:
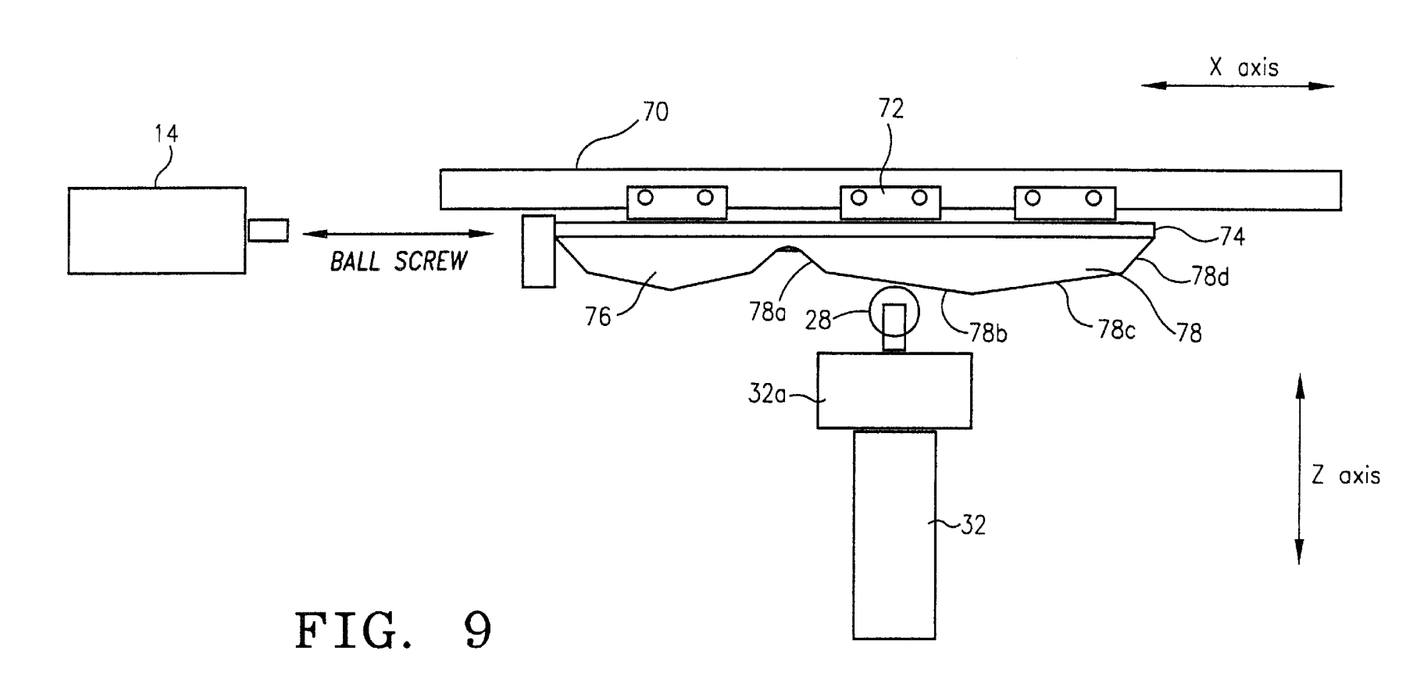
FIG. 9 illustrates a second embodiment of the instant invention wherein the direction convert cams are mounted to a carriage movable along a guide that extends along the x axis.

Another embodiment of the instant invention is shown in FIG. 9. As illustrated, the system shown in FIG. 9 includes a linear guide 70 mounted longitudinally at one direction to the frame of the sheet fabrication machine. Movably mounted to longitudinal guide 70, by means of a number of grippers 72 with bearings, is a carriage 74. Carriage 74 has mounted to its underside a plurality of direction convert units in the form of cams 76 and 78. Although only two cams are shown to be mounted to carriage 74, in practice a greater number of cams may be mounted to carriage 74. As shown, cam 76 and 78 each have a multiple number of contact surfaces such as for example 78a, 78b, 78c and 78d for cam 78. The movement of carriage 74 along guide 70 is provided by for example a ball screw mechanism, the power of which is supplied by a drive means such as for example servomotor 14.

As further shown in FIG. 9, roller 28 is affixed to a top portion 32a of ram 32 so that as roller 28 comes into contact with a surface of one of the direction convert units and be biased thereby, it would force ram 32 to move along the direction of the z axis.

Further, given that the cams mounted to carriage 74 are in alignment or in line with each other, by moving carriage 74 bidirectionally along the x axis, roller 28 could in fact be contacted by a multiple number of cams, for example both cams 76 and 78 as shown in the exemplar embodiment of FIG. 9. This ability to drive ram 32 with different forces and speeds in a single stroke, i.e., the movement of carriage 74 in one direction, means that operations that require different forces and speeds at different places of a worksheet could be much more readily accomplished with this embodiment of the instant invention.

By way of example, a particular location of the worksheet could be worked on by tool 38, whose movement was effected for example by the upward sloping surface of the first cam. When tool 38 retracts due to roller 28 coming into contact with the downward sloping surface of the cam, the sheet could be moved by controller 33 (FIG. 1) so that a different location thereof is positioned underneath tool 38. And as carriage 74 is further moved along the one direction, roller 28 is biased by another cam so as to be driven by the inclined contact surfaces of that cam to drive the tool to work on the worksheet at that different location.

To provide more cam choices, carriage 74 may have incorporated thereonto additional cams (not shown) behind cams 76 and 78 (along the direction into the paper), so that by moving carriage 74 in a direction toward the reader, a different set of cams may be aligned along the x axis with roller 28 for other types of operations.

While preferred embodiments of the present invention are disclosed herein for purposes of explanation, numerous changes, modifications, variations, substitution and equivalents, in whole or in part, should now be apparent to those skilled in the art to which the present invention pertains. Accordingly, it is invention that the invention be limited only by the spirit and scope of the hereto appended claims.

What is claimed is:

1. A turret punch press, comprising:
   drive means movable along one direction;
   at least one tool means movable along an other direction;
   direction convert means movably interposed between said drive means and said tool means for converting the movement of said drive means along said one direction to a movement of said tool means along said other direction when said drive means is moved along said one direction, said direction convert means having one side whereon at least two contact means each having at least one surface for making contact with said drive means are mounted and an opposite side for driving said tool means when said drive means makes contact with any one surface of said contact means.

2. The turret punch press of claim 1, wherein said drive means further comprises rotating means; and
   wherein any of said contact means comprises a cam having at least two surfaces each sloped at an angle to intersect at an apex, said surfaces respectively making contact with said rotating means as said drive means is moved along said one direction for driving said tool means along said other direction.

3. The turret punch press of claim 1, wherein each of said contact means comprises:
   a cam having at least two surfaces each sloped at an angle to intersect with the other to form an apex, said surfaces respectively making contact with said tool means as said cam is driven along said one direction so as to drive said tool means along said other direction.

4. The turret punch press of claim 1, wherein said contact means each comprise a cam having at least two surfaces angled toward each other to form an apex, the angles formed by the slopes of the surfaces being different for each cam so that different forces are directed to said tool means by the respective cams.

5. The turret punch press of claim 1, wherein at least one of said contact means comprises a cam having at least one non-linear surface that, when driven along said one direction, drives said tool means along said other direction.

6. The turret punch press of claim 1, wherein said drive means further comprises:
   guide means extending along said one direction; and
   carriage means whereon said contact means are mounted in line movably coupled to said guide means.

7. The turret punch press of claim 1, wherein said drive means comprises rotating means and wherein said direction convert means further comprises:
   a plate whereon said contact means are mounted; and
   an other drive means for driving said plate to selectively move any one of said contact means into contact position with said rotating means for driving said tool means along said other direction.

8. The turret punch press of claim 7, wherein there are at least three contact means mounted on said plate, each of said contact means comprises a cam having at least two surfaces angled toward each other to intersect at an apex, said surfaces selectively being moved into contact with said rotating means to move said tool means along said other direction.

9. A turret punch press, comprising:
   guide means extending along one direction;
   at least one tool means movable in an other direction;
   carriage means movable along said guide means, said carriage means having coupled thereto a plurality of direction convert means; and
   drive means for moving said carriage means along said guide means, said carriage means positioning at least one of said plurality of direction convert means into contact with said tool means as it is selectively driven by said drive means bidirectionally along said guide means;
   wherein said at least one direction convert means translates the force exerted thereagainst along said one direction to drive said tool means with a given force along said other direction.

10. The turret punch press of claim 9, further comprising:
    rotating means interposed between said direction convert means and said tool means, said rotating means being rotated by said one direction convert means as said one direction convert means makes contact therewith, said rotating means being workingly coupled to said tool means so that as said rotating means is being rotated by said one direction convert means, it drives said tool means along said other direction.

11. The turret punch press of claim 9, wherein each of said direction convert means comprises a cam having at least two surfaces angled towards each other so as to intersect at an apex, said two surfaces and said apex each acting against said tool means at any one time when said each direction convert means is driven to contact said tool means, said other direction being substantially orthogonal to said one direction.

12. The turret punch press of claim 9, wherein said direction convert means each comprise a cam having at least two surfaces angled toward each other to form an apex, the angles formed by the slopes of the surfaces being different for each cam so that different forces are generated by respective ones of said cams when said cams are moved along said guide means into contact with said tool means, said plurality of direction convert means being coupled in line to said carriage means.

13. The turret punch press of claim 9, wherein at least one of said direction convert means comprises a cam having at least one non-linear surface that acts against said tool means when said each direction convert means is driven to contact said tool means.

14. A turret punch press, comprising:
contact means movable along one direction;
at least one tool means movable in an other direction;
drive means for moving said contact means along said one direction; and
carriage means having a plurality of direction convert means interposed between said contact means and said tool means, said carriage means positioning one of said direction convert means into working relationship with said tool means and said contact means so that as said contact means is moved along said one direction and makes contact with said one direction convert means, said tool means is driven in said other direction.

15. The turret punch press of claim 14, wherein each of said direction convert means comprises a cam having at least two surfaces angled towards each other so as to intersect at an apex, the angles formed by the slopes of the surfaces being different for each cam;
wherein said contact means acts against said each cam when it is driven by said drive means along said one direction; and
wherein said each cam, when acted on by said contact means, drives said tool means in said other direction with a force corresponding to the angle of the surface of said each cam, said other direction being substantially orthogonal to said one direction.

16. The turret punch press of claim 14, wherein at least one of said direction convert means comprises a cam having at least one non-linear surface that is acted against by said contact means as said contact means is driven by said drive means along said one direction to drive said tool means in said other direction, said cam driving said tool means being driven in said other direction with a force corresponding to the curvature of said non-linear surface.

17. The turret punch press of claim 15, further comprising:
an other drive means for driving said carriage means to selectively position any one of said plurality of direction convert means into alignment with said tool means and said contact means, so as to actuate said tool means with a particular force.

18. The turret punch press of claim 14, wherein said contact means comprises a rotating mechanism, said machine further comprising:

guide means extending along said one direction;
wherein said rotating mechanism is movably coupled to said guide means so as to be driven by said drive means.

19. The turret punch press of claim 14, wherein said tool means comprises at least one punch tool for effecting work to a worksheet placed on a work table of said machine, said one punch tool working cooperatively with a corresponding die, said worksheet being sandwiched between said punch tool and said die.

20. A method of driving a tool means in a turret punch press comprising the steps of:
driving a contact means along one direction toward the turrets of said turret punch press;
positioning at least one tool means mounted on one of the turrets to be movable in an other direction;
mounting a plurality of direction convert means on a carriage means movably positioned relative to said tool means;
interposing said carriage means between said contact means and said tool means; and
moving said carriage means to position one of said direction convert means into working relationship with said tool means and said contact means so that as said contact means is driven along said one direction, said tool means is driven in said other direction.

21. Method of claim 20, further comprising the steps of:
configuring each of said direction convert means as a cam having at least two surfaces angled towards each other so as to intersect at an apex, the angles formed by the slopes of the surfaces being different for each cam; and
driving said contact means along said one direction to act against said each cam so as to cause said each cam to drive said tool means in said other direction with a force corresponding to the angle of the surface of said each cam.

22. Method of claim 20, further comprising the steps of:
configuring at least one of said direction convert means as a cam having at least one non-linear surface; and
driving said contact means along said one direction to act against said cam so as to cause said cam to drive said tool means in said other direction with a force corresponding to the curvature of said non-linear surface.

23. Method of claim 20, further comprising the steps of:
extending a guide means along said one direction;
configuring said contact means to include a rotating mechanism;
movably coupling said rotating mechanism to said guide means; and
driving said rotating mechanism along said guide means for making contact with said contact means.

24. A sheet fabrication machine, comprising:
drive means for driving a drive mechanism along one direction;
at least one tool means movable along an other direction;
a movable means having multiple drive contact surfaces thereon interposed between said drive mechanism and said tool means, said movable means being positioned over said tool means, said movable means movable to position any one of the drive contact surfaces thereon to intercept the movement of said drive mechanism along said one direction;
wherein when said drive mechanism is driven by said drive means along said one direction and comes into contact with said one drive contact surface, said movable means is driven to drive said tool means along said other direction.

25. The sheet fabrication machine of claim 24, wherein said movable means has on the side thereof that faces said drive mechanism a plurality of cams each having multiple ones of said drive contact surfaces, the other side of said movable means having a surface that is in contact with or comes into contact with said tool means when said drive mechanism makes contact with said one drive contact surface.

26. The sheet fabrication machine of claim 24, wherein said movable means is rotatable about a center of rotation relative to said tool means.

27. The sheet fabrication machine of claim 26, wherein when one of said drive contact surfaces is positioned to be driven by said drive mechanism, the other drive contact surfaces on said movable means are replaceable with other drive contact surfaces.

28. The sheet fabrication machine of claim 24, wherein said movable means is movable along a plane between said drive mechanism and said tool means.

29. The sheet fabrication machine of claim 24, wherein said drive contact surfaces are formed on cams mounted on said movable means, each of said cams having at least one drive contact surface.

30. The sheet fabrication machine of claim 24, wherein said movable means comprises a plate either rotatable about a center of rotation or movable along a plane relative to said tool means.

* * * * *